US 6,653,389 B2

(12) United States Patent
Burris et al.

(10) Patent No.: US 6,653,389 B2
(45) Date of Patent: Nov. 25, 2003

(54) AQUEOUS CRUMB RUBBER COMPOSITION

(75) Inventors: Michael V. Burris, Carlsbad, CA (US); Bryan B. Burris, Carlsbad, CA (US)

(73) Assignee: Flex Products, Inc., Carlsbad, CA (US)

( * ) Notice: Subject to any disclaimer, the term of this patent is extended or adjusted under 35 U.S.C. 154(b) by 39 days.

(21) Appl. No.: 09/989,763

(22) Filed: Nov. 19, 2001

(65) Prior Publication Data

US 2002/0082332 A1 Jun. 27, 2002

Related U.S. Application Data

(60) Provisional application No. 60/252,351, filed on Nov. 20, 2000, and provisional application No. 60/270,096, filed on Feb. 20, 2001.

(51) Int. Cl.⁷ .................................................. C08K 3/00
(52) U.S. Cl. ........................... 524/445; 524/59; 524/62; 524/70; 524/474
(58) Field of Search ............................ 524/445, 59, 62, 524/474, 70

(56) References Cited

U.S. PATENT DOCUMENTS

| | | |
|---|---|---|
| 1,620,899 A | 3/1927 | Kirschbaun |
| 1,690,020 A | 10/1928 | Kirschbaun |
| 1,705,333 A | 3/1929 | Mullen |
| 1,733,494 A | 10/1929 | Kirschbraun |
| 1,745,084 A | 1/1930 | Dewey |
| 1,767,533 A | 6/1930 | Kirschbraun |
| 2,700,655 A | 1/1955 | Endres ................ 260/28.5 |
| 3,284,397 A | 11/1966 | Johnston ............... 260/29.7 |
| 3,567,476 A | 3/1971 | Masciantonio .......... 106/277 |
| 3,577,250 A | 5/1971 | Rostler ................ 106/278 |
| 3,891,585 A | 6/1975 | McDonald ............. 260/28.5 |
| 3,900,692 A | 8/1975 | Rostler ................ 428/489 |
| 3,919,148 A | 11/1975 | Winters et al. ......... 260/28.5 |
| 4,018,730 A | 4/1977 | McDonald ............ 260/17.4 R |
| 4,021,393 A | 5/1977 | McDonald ......... 260/28.5 AS |
| 4,041,712 A | 8/1977 | Stepien, Jr. et al. ....... 61/36 R |
| 4,056,401 A | 11/1977 | DeBough .............. 106/277 |
| 4,068,023 A * | 1/1978 | Nielsen et al. .......... 427/138 |
| 4,069,182 A | 1/1978 | McDonald ............. 260/28.5 |
| 4,137,204 A | 1/1979 | McDonald ............. 260/28.5 |
| 4,193,816 A | 3/1980 | Ferm et al. ............. 106/277 |
| 4,211,575 A | 7/1980 | Burris ................. 106/274 |
| 4,268,577 A * | 5/1981 | Fahey ................. 428/394 |
| 4,298,397 A | 11/1981 | Burris ................. 106/274 |
| 4,548,962 A | 10/1985 | Lindmark .............. 523/220 |
| 4,564,310 A | 1/1986 | Thelen ................. 404/31 |
| 4,609,696 A | 9/1986 | Wilkes ................. 524/59 |
| 4,621,108 A | 11/1986 | Burris ................. 523/340 |
| 5,151,456 A | 9/1992 | Elias .................. 524/60 |
| 5,180,428 A | 1/1993 | Koleas ................ 106/277 |
| 5,436,285 A | 7/1995 | Causyn et al. ........... 524/68 |
| 5,488,080 A | 1/1996 | Osborn ................ 524/270 |
| 5,492,561 A | 2/1996 | Flanigan .............. 106/273 |
| 5,604,277 A | 2/1997 | Osborn ................ 524/270 |
| 5,719,215 A * | 2/1998 | Liang et al. ............. 524/62 |
| 5,811,477 A * | 9/1998 | Burris et al. ............. 524/60 |
| 5,827,568 A * | 10/1998 | Wickett ................ 427/136 |
| 5,904,760 A | 5/1999 | Hayner ................ 106/279 |
| 5,911,817 A | 6/1999 | Hayner ................ 106/279 |
| 5,936,015 A | 8/1999 | Burns .................. 524/71 |
| 5,959,007 A | 9/1999 | Liang .................. 524/62 |
| 5,990,207 A | 11/1999 | Perret et al. ............. 524/59 |
| 6,027,557 A | 2/2000 | Hayner ................ 106/279 |
| 6,156,828 A | 12/2000 | Wickett ................ 524/60 |
| 6,194,519 B1 | 2/2001 | Blalock et al. ........... 525/232 |
| 2001/0004649 A1 | 6/2001 | Osborn ................ 524/270 |

FOREIGN PATENT DOCUMENTS

| | | |
|---|---|---|
| EP | 0 866 837 B1 | 5/2000 |
| RU | 0013603 | 1/1991 |

\* cited by examiner

*Primary Examiner*—David W. Wu
*Assistant Examiner*—Henry S. Hu
(74) *Attorney, Agent, or Firm*—Knobbe Martens Olson & Bear LLP

(57) ABSTRACT

A fluid or semifluid additive composition useful for asphalt paving consists essentially of between about 10% and about 50% crumb rubber, about 10% and about 50% petroleum hydrocarbon having at least 55% aromatics, between about 10% and about 50% surface active clay, and water, by weight.

25 Claims, No Drawings

AQUEOUS CRUMB RUBBER COMPOSITION

RELATED APPLICATIONS

This application claims priority to provisional application Ser. No. 60/252,351, filed on Nov. 20, 2000, and also to provisional application Ser. No. 60/270,096, filed on Feb. 20, 2001.

BACKGROUND OF THE INVENTION

U.S. Pat. Nos. 5,539,029 and 5,811,477 disclose aqueous asphalt emulsion compositions containing rubber particles and polymer latex in specific ratios and methods for preparing and using the rubber-containing asphalt emulsions. The methods of preparing the emulsions are advantageous over previous methods of mixing rubber particles with asphalt at temperatures above 300° F., and typically between about 350° F. and 500° F. Such high temperature mixing is environmentally disadvantageous, especially when air pollution standards are violated.

SUMMARY OF THE INVENTION

Aqueous rubber-containing additive compositions may be used for improving asphalt compositions including recycled asphaltic concrete (RAP) and other asphalt paving and road surface compositions. The aqueous rubber-containing compositions of the present invention are fluid or semifluid additives comprising and preferably consisting essentially of a mixture of crumb rubber, aromatic petroleum hydrocarbon, surface active clay and/or Theological or thixotropic agent, and sufficient water to form the fluid or semifluid composition. The aromatic hydrocarbon and crumb rubber may be added to a mixture of water and clay and/or rheological agent, or the crumb rubber added to an aqueous emulsion of the aromatic hydrocarbon and a thixotropic agent. The additive is prepared at substantially ambient temperatures or temperatures below the boiling point of the liquid composition. The composition may also contain polymer latex. Other materials may be present in a final additive composition, as will be disclosed further hereinafter.

DETAILED DESCRIPTION OF THE PREFERRED EMBODIMENTS

The additive composition of the present invention is conveniently prepared by mixing the ingredients at substantially ambient temperature, e.g., a temperature between about 35° F. and about 110° F., and more preferably between about 60° F. and about 95° F., or at higher temperatures, if desired, but below the boiling point of the aqueous composition. Since a substantial advantage is realized by not having to heat the materials prior to or during mixing, it is most advantageous to simply mix the ingredients at the temperature of the environment at the time and place of mixing. Such ambient temperature mixing avoids the necessity of heating equipment and use of heating fuel or energy, thus further improving the efficiency and reducing costs. However, under certain conditions, for example in cold weather, heating may be applied so long as the composition temperature is below its boiling point.

A preferred composition of the invention is a fluid or semifluid additive composition containing crumb rubber, aromatic petroleum hydrocarbon, clay and/or other Theological agent, and water. The above amounts as well as those expressed hereinafter are given by weight.

The clays used in the additive compositions of the invention are preferably the surface active clays, i.e., a clay which has wetting properties thus reducing the surface tension between the components in an aqueous mixture. The preferred surface active clays are capable of maintaining suspension of the crumb rubber in the mixture aqueous without settling, as well as substantially preventing separation of the liquid aromatic hydrocarbon in the water-containing mixture. Examples of useful surface active clays include the bentonites, sodium bentonite or sodium montmorillonite, as well as calcium bentonite. For some additive mixtures, it is preferred to use non- or low-swelling or low-expanding clays such as calcium bentonite and kaolin. Other useful clays include hydrated aluminum silicate and hydrated magnesium silicate clays such as serpentine, chrysotile, asbestos, talc, and hydrated aluminum-magnesium silicates such as attapulgite and fuller's earth. The above clays are given by way of example, and other clays, known to those skilled in the art, may be used. Mixtures of such clays may also be used.

Rheological agents, also referred to as thixotropic agents or thickeners may be used in addition to or instead of the aforesaid clays. Such agents, include urethanes, alkali swellable latex thickeners such as SBR and acrylic latexes, cellulose products, gums, starch products, alkyl amines, polyacrylic resins, and polymer fibers. Useful polymer fibers comprise natural, synthetic or semisynthetic fibers. Natural fibers include polysaccharides such as starch, cellulose, pectin, seaweed and vegetable gums. Synthetic fibers include thermoplastic and thermosetting synthetic resins. Thermoplastic polymers include nylon, PVC, polyethylene, polystyrene, polypropylene, fluorocarbons, polyurethane and acrylic resins (acrylates). Thermosetting resins include cross-linked polyethylene, phenolics, alkyd and polyester resins. The semisynthetic polymer resin fibers are cellulosics including rayon, methylcellulose, cellulose acetate and modified starches. Any polymer fibers of the aforesaid type may be used. Preferred fibers are semisynthetic polymer fibers obtained from recycled materials such as used newsprint or other paper, cardboard, processed wood or similar processed cellulosic fiber materials. Useful fibers may be obtained from other recycle sources including ground up rubber tires which include tire carcass fibers such as nylon, polyester and rayon fibers. If used, fibers present in the solids mix may be in a rubber particle:polymer fiber ratio of between 1:99 and 99:1, respectively, by weight, although the amount of fibers is preferably between about 0.1% and about 10%, by weight of the solids mix. Such useful rheological agents and others are disclosed in U.S. Pat. No. 5,811,477, the description of which is incorporated herein by reference.

The crumb rubber used in the additive composition of the invention comprises rubber particles. Any rubber particle sizes may be used. However, preferably at least a portion of the particles will pass a #10 mesh U.S. series sieve, and more preferably passing a #20, #30 or #40 mesh sieve and up to #200 mesh. The rubber particles may be natural, thermoplastic or synthetic rubber or mixtures of the rubbers. Examples of synthetic rubbers are polysulfides, polychloroprene, butadiene-styrene copolymers (SBR), polyisoprene, butyl rubber (isobutylene-isoprene copolymers), polyacrylonitrile, polyurethane, silicone and nitrile (acrylonitrile-butadiene copolymers). Thermoplastic rubbers include block copolymers of styrene-butadiene or styrene isoprene. The rubber may be obtained from recycled or reclaimed rubber tire products. Such particles are produced by grinding used rubber tires to relatively small particle sizes. The recovery and use of such crumb rubber particles are more fully described in U.S. Pat No. 5,811,477, the description of which is incorporated herein by reference.

The rubber particles need not be from used rubber sources and any portion or all of the rubber may be virgin.

The aromatic petroleum hydrocarbon is one having above about 50%, preferably above about 55% and more preferably above about 65% aromatics, by weight. Such materials are specifically disclosed in U.S. Pat. No. 4,298,397, the description of which is incorporated herein by reference. These aromatic hydrocarbons used may comprise mixtures of such hydrocarbons. Preferred aromatic hydrocarbons have initial boiling points above about 500° F. An example of commercially available aromatic hydrocarbon composition is Dutrex®, available from Shell Chemical Co.

The aromatic hydrocarbon used in the composition may also be polymer-modified, preferably where no polymer latex is present in the composition. Polymers used for modifying the hydrocarbon are synthetic polymers, which have been added to or mixed with the liquid hydrocarbon and are well known to those skilled in the art. Preferred synthetic polymers are a styrene-butadiene copolymer such as SBR or styrene-butadiene-styrene block copolymers sold under the registered trademarks Kraton® or Hytrel®. The SBR may also be cross-linked, for example, with carboxylate groups resulting from treatment with methacrylic acid, or the like. Other useful polymers include neoprene, acrylic, vinylacrylic, acrylic terpolymers, nitrile, polyvinyl alcohol, polyvinyl acetate, vinyl acetate-ethylene, vinyl ester copolymers, ethylene vinyl chloride, polyvinylidene chloride, butyl, acrylonitrile-butadiene, polyurethanes, silicones, and block copolymers such as styrene-isoprene (SIS), styrene-ethylene-vinyl acetate (SEVAS) and styrene acrylate. The amount of polymer present in the aromatic hydrocarbon may be up to about 20% by weight of the hydrocarbon present in the composition.

The composition of the invention also optionally includes polymer latex or latex rubber. Such latexes are disclosed in U.S. Pat. No. 5,811,477, the description of which is incorporated by reference. Where latex is used, preferred amounts are between about 1% and about 10%, by weight, of the additive composition.

The additive composition of the invention may be prepared by a number of different methods. For example, water and a surface active clay may be mixed to form a slurry composition, and the crumb rubber and aromatic petroleum hydrocarbon blended with the slurry. The crumb rubber and aromatic hydrocarbon may be separately added to the aqueous slurry, or they may be pre-mixed with the mixture blended with the slurry. The amount of water used in preparing the composition is sufficient to form a fluid or semifluid composition capable of being poured or pumped.

An alternative method of preparing the additive is to first prepare an aqueous emulsion of the aromatic petroleum hydrocarbon and mix the crumb rubber and a clay or rheological agent or mixtures of the agent and clay with the aqueous emulsion. For this method, with an emulsifier present in the aqueous emulsion, the clay used need not be a surface active clay if the aqueous emulsion contains enough emulsifier to maintain the crumb rubber in colloidal dispersion or suspension in the additive composition. The aqueous emulsion may be anionic, cationic or non-ionic with specific emulsifiers used for preparing such emulsions well known to those skilled in the art, such as disclosed in U.S. Pat. No. 4,298,397, the descriptions of which are incorporated herein by reference.

The amounts of crumb rubber and aromatic petroleum hydrocarbon are between about 10% and about 50%, by weight of the additive composition, respectively. The amount of clay and/or rheological agent may be between about 0.1% and about 50%, by weight. Where clay is used as the rheological agent, alone or as a major amount of the rheological agent, e.g., above about 50%, the amount used in the additive composition is preferably between about 1% and about 50% and more preferably between about 10% and about 50%, by weight, of the additive composition. When cellulosic fibers such as methylcellulose or other cellulose-containing or derived fiber materials are used as the rheological agent, smaller amounts such as about 0.1% up to about 20% may be used. Other of the aforesaid rheological agents are preferably used in amounts of between about 1% and about 25%. The specific ratios of the ingredients will depend on the use of the additive and the type of product to which it is added.

The aqueous additive composition of the present invention is especially useful for mixing with asphalts, particularly asphalt/aggregate mixtures used for road surfacing or paving. The use and advantages of crumb rubber in asphaltic paving compositions is well known in the asphalt paving art. The compositions of the present invention are especially advantageous since the petroleum aromatic hydrocarbon seasons the rubber in-situ in the aqueous composition at ambient or environmental temperatures. The presence of the aromatic hydrocarbon within the aqueous fluid composition gradually softens the rubber, making it tackier, more pliable and readily blended with liquid asphalt. The additive compositions may be used in hot mix, warm mix or cold mix asphalt processing, all well known to those skilled in the art. The amount of additive used in such processing will depend on the requirements as well as the types of asphalts and asphaltic compositions used in the hot, cold or warm mix processing. Typical amounts will be between about 5% to about 50%, by weight, of the asphalt. The additive composition is also especially useful in treating RAP, recycled asphaltic concrete paving compositions. Such RAP processing may be accomplished using the additive composition of the invention with 100% RAP or mixtures of RAP and virgin asphalt/aggregate blends. These as well as other uses and advantages of the compositions of the invention will be evident to those skilled in the art.

What is claimed is:

1. A fluid or semifluid additive composition comprising between about 10% and about 50% crumb rubber, about 10% and about 50% petroleum hydrocarbon having above about 50% by weight aromatics, between about 10% and about 50% clay by weight, respectively, and water.

2. A composition of claim 1 further comprising between about 1% and about 20% polymer latex, by weight.

3. A composition of claim 1 wherein said clay is a surface active clay.

4. A composition of claim 3 wherein said surface active clay is a low expanding or non-expansive clay.

5. A fluid or semifluid additive composition comprising between about 10% and about 50% crumb rubber, about 10% and about 50% aqueous emulsion of a petroleum hydrocarbon having above about 50% by weight aromatics, and between about 0.1% and about 50% rheological agent, by weight, respectively.

6. A composition of claim 5 further comprising between about 1% and about 20% polymer latex.

7. A composition of claim 1 wherein said crumb rubber comprises particles of rubber, at least a portion of which pass through a #10 mesh U.S. series sieve.

8. A composition of claim 1 wherein said crumb rubber comprises particles of rubber, at least a portion of which pass through a #200 mesh U.S. series sieve.

9. A composition of claim 7 wherein at least a portion of said crumb rubber is reclaimed rubber.

10. A composition of claim 7 wherein at least a portion of said crumb rubber is virgin rubber.

11. A composition of claim 1 wherein said petroleum hydrocarbon is polymer modified and contains up to about 20%, by weight, synthetic polymer.

12. A fluid or semifluid additive composition consisting essentially of between about 10% and about 50% crumb rubber, about 10% and about 50% petroleum hydrocarbon having above about 50% by weight aromatics, between about 10% and about 50% clay by weight, respectively, and water.

13. A composition of claim 12 further comprising between about 1% and about 20% polymer latex, by weight.

14. A composition of claim 12 wherein said clay is a surface active clay.

15. A composition of claim 14 wherein said surface active clay is a low expanding or non-expansive clay.

16. A fluid or semifluid additive composition consisting essentially of between about 10% and about 50% crumb rubber, about 10% and about 50% aqueous emulsion of a petroleum hydrocarbon having above about 50% by weight aromatics, and between about 0.1% and about 50% rheological agent, by weight, respectively.

17. A composition of claim 16 further comprising between about 1% and about 20% polymer latex.

18. A composition of claim 16 wherein said crumb rubber comprises particles of rubber, at least a portion of which pass through a #10 mesh U.S. series sieve.

19. A composition of claim 18 wherein said crumb rubber comprises particles of rubber, at least a portion of which pass through a #200 mesh U.S. senes sieve.

20. A composition of claim 18 wherein at least a portion of said crumb rubber is reclaimed rubber.

21. A composition of claim 18 wherein at least a portion of said crumb rubber is virgin rubber.

22. A composition of claim 1 wherein said petroleum hydrocarbon is polymer modified and contains up to about 20%, by weight, synthetic polymer.

23. A method of treating a recycled asphalt pavement comprising mixing particles of recycled asphalt pavement with an additive composition of claim 1.

24. A method of treating a recycled asphalt pavement comprising mixing particles of recycled asphalt pavement with an additive composition of claim 5.

25. A method of treating a hot mix asphalt composition comprising mixing therewith an additive composition of claim 1.

* * * * *